United States Patent [19]

Ozkan et al.

[11] Patent Number: 6,111,611
[45] Date of Patent: Aug. 29, 2000

[54] SYSTEM FOR FORMING AND PROCESSING PROGRAM SPECIFIC INFORMATION SUITABLE FOR TERRESTRIAL, CABLE OR SATELLITE BROADCAST

[75] Inventors: Mehmet Kemal Ozkan, Indianapolis, Ind.; Chia-Yuan Teng, San Diego, Calif.; Edwin Arturo Heredia, Indianapolis, Ind.

[73] Assignee: Thomson Consumer Electronics, Indianapolis, Ind.

[21] Appl. No.: 09/057,646

[22] Filed: Apr. 9, 1998

Related U.S. Application Data

[60] Provisional application No. 60/052,152, Jul. 10, 1997.

[51] Int. Cl.$^7$ ................................................. H04N 7/00
[52] U.S. Cl. .............................. 348/465; 348/7; 348/906
[58] Field of Search ..................................... 348/465, 469, 348/845.2, 906, 845, 473, 476, 7, 460, 461, 10, 327, 328; 709/217, 219

[56] References Cited

U.S. PATENT DOCUMENTS

| | | | |
|---|---|---|---|
| 5,359,601 | 10/1994 | Wasilewski et al. | 370/73 |
| 5,459,522 | 10/1995 | Pint | 348/465 |
| 5,521,979 | 5/1996 | Deiss | 348/465 |
| 5,594,492 | 1/1997 | O'Callagan et al. | 348/10 |
| 5,600,378 | 2/1997 | Wasilewski | 348/468 |
| 5,642,153 | 6/1997 | Chaney et al. | 348/7 |
| 5,946,045 | 8/1999 | Ozkan et al. | 348/906 |

FOREIGN PATENT DOCUMENTS

| | | | |
|---|---|---|---|
| 751 680 | 1/1997 | European Pat. Off. | H04N 5/44 |
| 758 833 A2 | 2/1997 | European Pat. Off. | H04N 7/16 |

OTHER PUBLICATIONS

European Telecommunications Standards Institute, "Digital Broadcasting Systems For Television, Sound And Data Services; Specification For Service Information (SI) In Digital Broadcasting (DVB) Systems", Oct. 1995, pp. 1–61, France.

PCT Search Report Attached.

MPEG systems standard—*ISO/IEC* 13818–1, Jun. 10, 1994, Section 2.4 and Section 2.6.

Program Guide for Digital Television, ATSC Standard of Jan. 3, 1996, prepared by the United States Advanced Television Systems Committee (ATSC) Doc. A/55.

Electronic Programme Guide (EPG); Protocol for a TV Guide Using Electronic Data Transmission, ETS 300 707 of May 1997, prepared by the European Telecommunications Standards Institute (ETSI), Sections 8–11, pp. 30–62.

*Primary Examiner*—Victor R. Kostak
*Attorney, Agent, or Firm*—Joseph S. Tripoli; Ronald H. Kurdyla; Alexander J. Burke

[57] ABSTRACT

Program channels are allocated first and second identification numbers in packetized program information used in video processing and storage medium formats. Packetized program information is decoded to provide data content of a program. Channel map information in the packetized program information is identified. The channel map includes a first identification number for use in identifying a first broadcast sub-channel and the first identification number is associated with a first broadcast source. The channel map also includes a second identification number for use in identifying the first broadcast sub-channel from among a group of sub-channels associated with the first identification number. The identified information is assembled to form a channel map suitable for use in identifying a program transmitted on the first broadcast channel using the first and second identification numbers in conjunction.

31 Claims, 7 Drawing Sheets

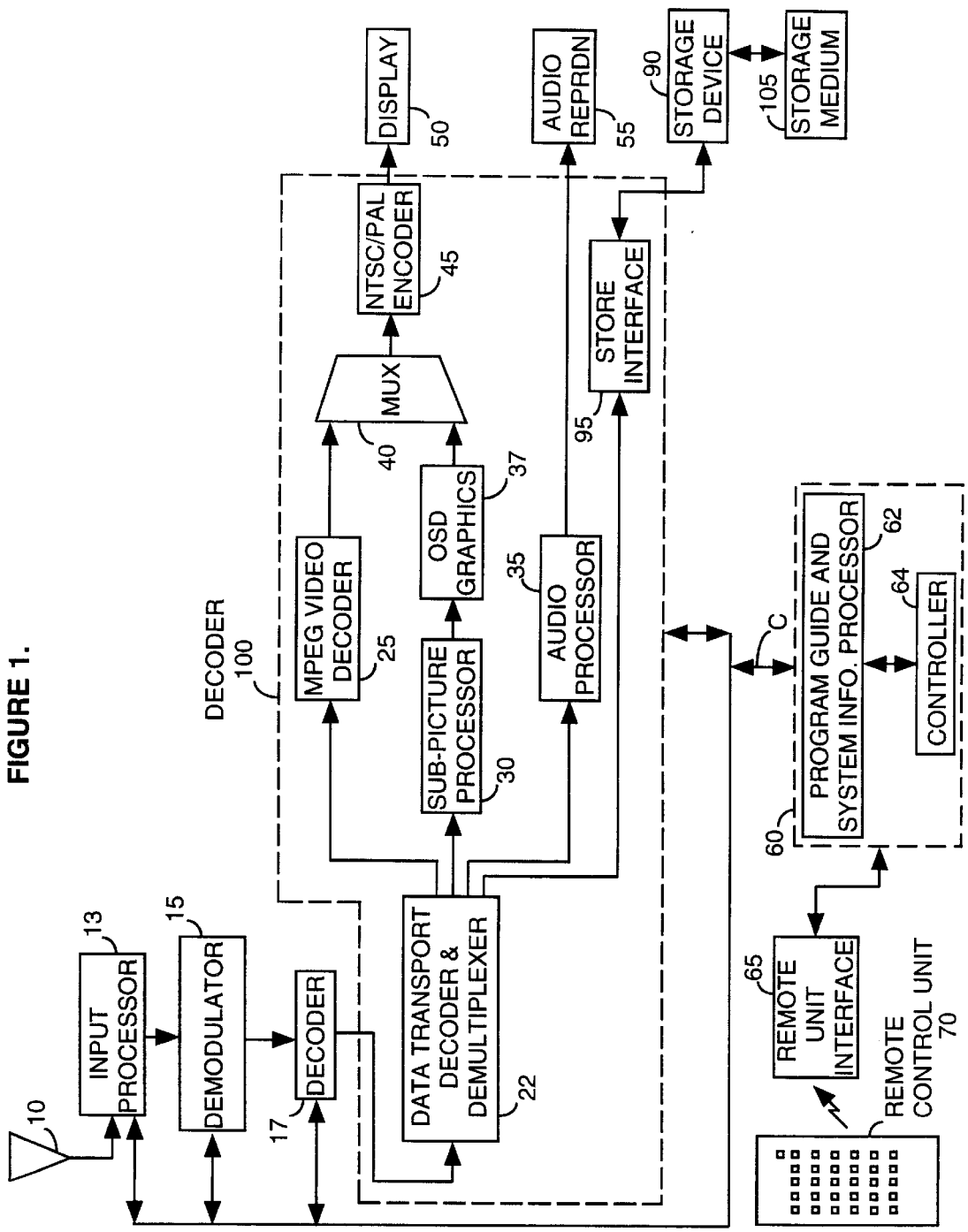

Bit Stream Syntax for the Master Guide Table

| Syntax | Bits | Format |
|---|---|---|
| master_guide_table_section () { | | |
|   table_id | 8 | 0xE0 |
|   section_syntax_indicator | 1 | '1' |
|   private_indicator | 1 | '1' |
|   reserved | 2 | '11' |
|   private_section_length | 12 | uimsbf |
|   table_id_extension | 16 | 0x0000 |
|   reserved | 2 | '11' |
|   version_number | 5 | uimsbf |
|   current_next_indicator | 1 | '1' |
|   section_number | 8 | 0x00 |
|   last_section_number | 8 | 0x00 |
|   reserved | 3 | '111' |
|   CRT_version_number | 5 | uimsbf |
|   zero | 4 | '0000' |
|   num_pg | 4 | uimsbf |
|   for (i=0;i< num_pg;i++) PG(i) { | | |
|     application_time | 40 | uimsbf |
|     duration | 16 | uimsbf |
|     reserved | 2 | '11' |
|     CIT_flag | 1 | blsbf |
|     num_bytes | 21 | uimsbf |
|     reserved | 3 | '111' |
|     PID_PG [i] | 13 | uimsbf |
|     reserved | 3 | '111' |
|     PID_ETT [i] | 13 | uimsbf |
|     reserved | 4 | uimsbf |
|     PG_descriptors_length | 12 | uimsbf |
|     for(j = 0;i< M;j++) | | |
|       descriptor () | var | |
|   } | | |
|   reserved | 4 | uimsbf |
|   descriptors_length | 12 | uimsbf |
|   for (i = 0;i< N;j++) | | |
|     descriptor () | var | |
|   CRC_32 | 32 | rpchof |
| } | | |

FIGURE 2

Bit Stream Syntax for the Channel Information Table

| Syntax | Bits | Format |
|---|---|---|
| channel_guide_table_section () { | | |
|     table_id | 8 | 0xE3 |
|     section_syntax_indicator | 1 | '1' |
|     private_indicator | 1 | '1' |
|     reserved | 2 | '11' |
|     section_length | 12 | uimsbf |
|     table_id_extension | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     num_channels_in_section | 8 | uimsbf |
|     for (k=0; k<num_channels_in_section;k ++) cha_info(k){ | | |
|         short_name | 8*6 | ISO-639 |
|         channel_visibility | 32 | bslbf |
|         bundle_channel_number{ | | |
|             bundle_number | 12 | uimsbf |
|             channel_number_in_bundle | 12 | uimsbf |
|         } | | |
|         Channel_PTC | 8 | uimsbf |
|         channel_id | 16 | uimsbf |
|         channel_type | 8 | uimsbf |
|         reserved | 3 | '111' |
|         ETM_flag | 1 | bslbf |
|         descriptors_length | 12 | uimsbf |
|         for (i=0;i<N;i++){ | | |
|             descriptors() | | |
|         } | | |
|     } | | |
|     CRC_32 | 32 | rpchof |
| } | | |

FIGURE 3

Bit Stream Syntax for the Service Location Descriptor

| Syntax | Bits | Format |
|---|---|---|
| service_location_descriptor () { | | |
|     descriptor_tag | 8 | uimsbf |
|     descriptor_length | 8 | uimsbf |
|     program_number | 16 | uimsbf |
|     reserved | 3 | '111' |
|     PCR_PID | 13 | uimsbf |
|     number_PIDs | 8 | uimsbf |
|     for (i=1;i<number_PIDs;i++){ | | |
|         stream_type | 8 | uimsbf |
|         reserved | 3 | bslbf |
|         elementary_PID | 13 | uimsbf |
|         ISO_639_language_code | 8*3 | uimsbf |
|     } | | |
| } | | |

405 — (descriptor_tag, descriptor_length)
410 — (program_number, reserved, PCR_PID)
415 — (stream_type)
420 — (reserved, elementary_PID, ISO_639_language_code)
425

FIGURE 4

Bit Stream Syntax for the Extended Text Table

| Syntax | Bits | Format |
|---|---|---|
| extended_text_table_section  () { | | |
|     table_id | 8 | 0xE5 |
|     section_syntax_indicator | 1 | '0' |
|     private_indicator | 1 | '1' |
|     reserved | 2 | '11' |
|     private_section_length | 12 | uimsbf |
|     ETM_id | 32 | bslbf |
|     extended_text_message | () | var |
| } | | |

FIGURE 5

| Bit | 1 | 2 | 3          18 | 19          32 |
|---|---|---|---|---|
| channel ETM_id | 0 | 0 | channel_id | 111............111 |
| event ETM_id | 1 | 0 | channel_id | event_id |

FIGURE 6

Bit Stream Syntax for multiple compressed strings

| Syntax | Bits | Format |
|---|---|---|
| multiple_compressed_strings () { | | |
|   number_strings | 8 | uimsbf |
|   for (i = 0;i< number_strings;i++) { | | |
|     number_bytes | 16 | uimsbf |
|     ISO_639_language_code | 8*3 | uimsbf |
|     coding_indicator | 8 | bslbf |
|     compression_type | 8 | uimsbf |
|     for (j = 0;j<number_bytes;j++) | | |
|       compressed_string_bype [j] | 8 | uimsbf |
|   } | | |
| } | | |

FIGURE 7

| compression_type | compression method |
|---|---|
| 0x00 | No compression |
| 0x01 | Huffman coding based on the default Huffman table |
| 0x02 | LZW |
| 0x03 to 0xAF | reserved |
| 0xB0 to 0xFF | user private |

FIGURE 8

| coding_indicator | coding method |
|---|---|
| 0x00 | Unicode |
| 0x01 | Latin-1 |
| 0x02 | Latin-2 |
| 0x03 to 0xAF | reserved |
| 0xB0 to 0xFF | user private |

FIGURE 9

SYSTEM FOR FORMING AND PROCESSING PROGRAM SPECIFIC INFORMATION SUITABLE FOR TERRESTRIAL, CABLE OR SATELLITE BROADCAST

This is a non-provisional application of provisional application serial No. 60/052,152 by E. A. Heredia et al, filed Jul. 10, 1997.

FIELD OF THE INVENTION

This invention is related to the formation of Program Guides, system information and program specific information for MPEG compatible processing.

BACKGROUND OF THE INVENTION

In video broadcast and processing applications, digital video data is typically encoded to conform to the requirements of a known standard. One such widely adopted standard is the MPEG2 (Moving Pictures Expert Group) image encoding standard, hereinafter referred to as the "MPEG standard". The MPEG standard is comprised of a system encoding section (ISO/IEC 13818-1, Jun. 10, 1994) and a video encoding section (ISO/IEC 13818-2, Jan. 20, 1995). Data encoded to the MPEG standard is in the form of a packetized datastream which typically includes the data content of many program channels (e.g. content corresponding to cable television channels 1–125). Further, several digital services and channels may occupy the frequency spectrum previously occupied by a single analog channel. A 6 MHz bandwidth previously allocated to an analog NTSC compatible broadcast channel may now be split into a number of digital sub-channels offering a variety of services. For example, the broadcast spectrum for RF channel 13 may be allocated to sub-channels including a main program channel, a financial service channel offering stock quotes, a sports news service channel and a shopping and interactive channel. In addition, both the quantity of sub-channels transmitted and the individual sub-channel bandwidth may be changed dynamically to accommodate changing broadcast programming requirements.

In such a digital video system the proliferation in the quantity of services being broadcast and the increased variety of their content, as well as the ability of a broadcaster to dynamically vary the number and allocated bandwidth of these channels poses a number of problems. Specifically, the increase in the quantity of broadcast channels may increase the difficulty of tuning and lengthen the time required to acquire a selected program channel. Further, as the quantity of channels increases so does the quantity of ancillary program specific information required in decoding the transmitted program data. The ancillary program specific information includes data used in identifying and assembling packets comprising selected programs and also includes program guide and text information associated with the transmitted program data. The increased quantity and variety of ancillary information transmitted places an additional burden on available transmission bandwidth and receiver decoding and storage resources.

In addition, channel numbering in such a digital video system may present a problem. This is because a broadcaster may not want to lose an original analog NTSC broadcast channel number even though the broadcaster is transmitting several program channels in the frequency spectrum previously occupied by the single analog program channel. The broadcaster may have a significant investment in the channel number as a brand identity e.g. Fox 5™, Channel 13™.

These problems and derivative problems are addressed by a system according to the present invention.

SUMMARY OF THE INVENTION

In a digital video system, individual program channels are allocated first and second identification numbers. The first identification number (a major number) is associated with an information provider. The second identification number (a minor number), is used in identifying a broadcast sub-channel from among a group of sub-channels associated with the first identification number. The first and second identification numbers in conjunction, are used in identifying data constituting a program transmitted on the broadcast sub-channel.

BRIEF DESCRIPTION OF THE DRAWINGS

In the drawing:

FIG. 1 is a block diagram of digital video receiving apparatus for demodulating and decoding broadcast signals, according to the principles of the invention.

FIG. 2 shows a Master Guide Table (MGT) format for use in conveying program specific information, according to the invention.

FIG. 3 shows a Channel Information Table (CIT) format for use in conveying program specific information incorporating dual program channel identification numbers, according to the invention.

FIG. 4 shows a Service Location Descriptor (SLD) format for use in conveying program specific information incorporating program map information, according to the invention.

FIG. 5 shows a program specific information text format for use in conveying program related text information, according to the invention.

FIG. 6 shows a scheme for assigning a text message identifier as used in the text format of FIG. 5.

FIG. 7 shows a multiple compressed text string format for use in conveying program related text information, according to the invention.

FIGS. 8 and 9 show exemplary indicator definitions for compression and coding indicators within the multiple compressed text string format of FIG. 7.

DETAILED DESCRIPTION OF THE DRAWINGS

Figure 10:
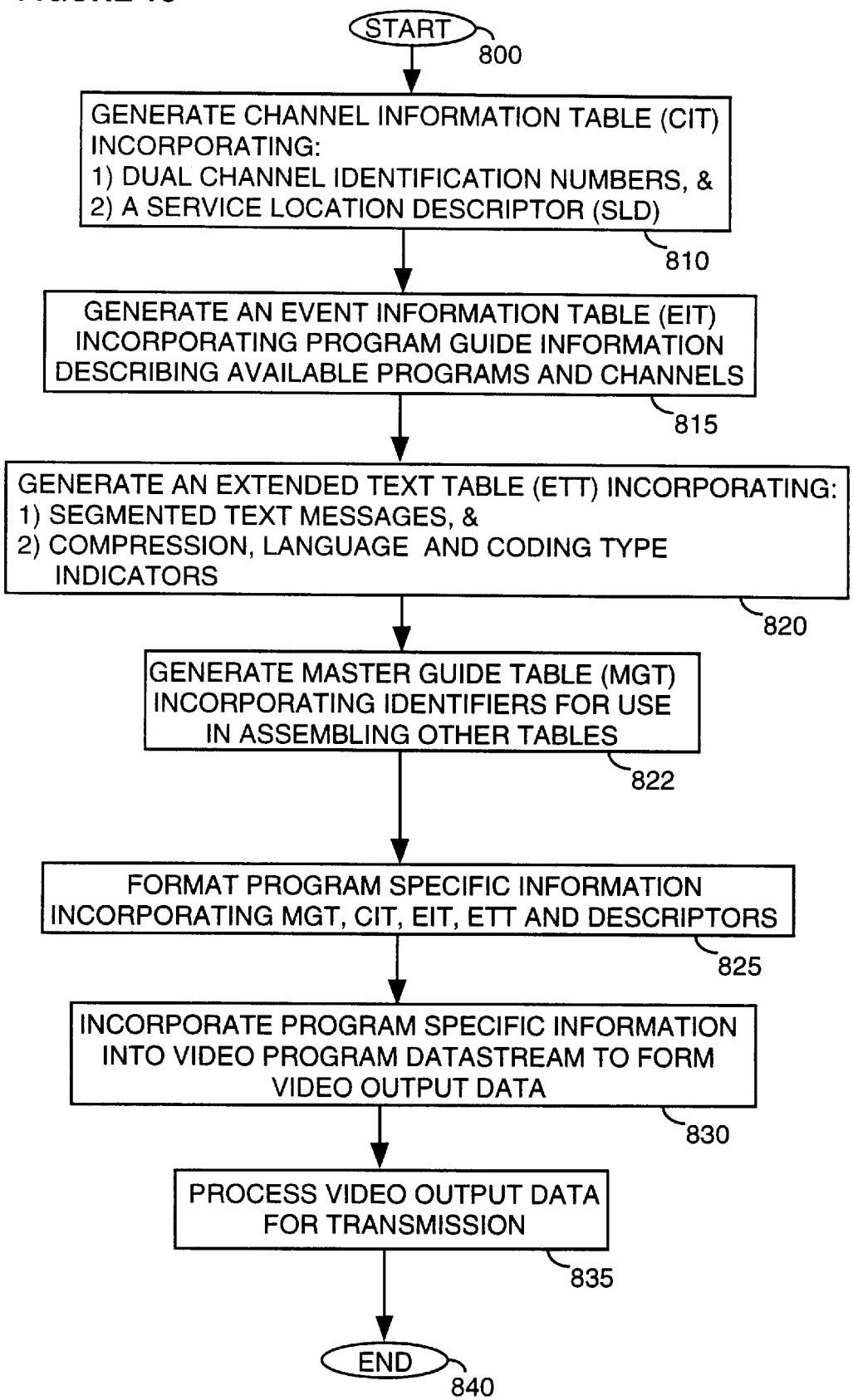
FIG. 10 shows a method for generating program specific information according to the invention.

FIG. 1 is a block diagram of a digital video receiving system for demodulating and decoding broadcast signals, according to the principles of the invention. Although the disclosed system is described in the context of a system for receiving video signals incorporating program specific information including program guide data in MPEG compatible format, it is exemplary only. The program specific information may be of a variety of types. For example, it may comply with Program Specific Information (PSI) requirements specified in section 2.4.4 of the MPEG systems standard or it may comply with the high definition television (HDTV) signal standard *Digital Television Standard* for HDTV *Transmission* of Apr. 12, 1995, prepared by the United States Advanced Television Systems Committee (ATSC) or other ATSC standards. Alternatively, it may be formed in accordance with proprietary or custom requirements of a particular system.

The principles of the invention may be applied to terrestrial, cable, satellite, Internet or computer network broadcast systems in which the coding type or modulation format may be varied. Such systems may include, for example, non-MPEG compatible systems, involving other types of encoded datastreams and other methods of conveying program specific information. Further, although the disclosed system is described as processing broadcast programs, this is exemplary only. The term 'program' is used to represent any form of packetized data such as audio data, telephone messages, computer programs, Internet data or other communications, for example.

In overview, in the video receiver system of FIG. 1, a broadcast carrier modulated with signals carrying audio, video and associated data representing broadcast program content is received by antenna 10 and processed by unit 13. The resultant digital output signal is demodulated by demodulator 15. The demodulated output from unit 15 is trellis decoded, mapped into byte length data segments, deinterleaved and Reed-Solomon error corrected by decoder 17. The corrected output data from unit 17 is in the form of an MPEG compatible transport datastream containing program representative multiplexed audio, video and data components. The transport stream from unit 17 is demultiplexed into audio, video and data components by unit 22 which are further processed by the other elements of decoder system 100. In one mode, decoder 100 provides MPEG decoded data for display and audio reproduction on units 50 and 55 respectively. In another mode, the transport stream from unit 17 is processed by decoder 100 to provide an MPEG compatible datastream for storage on storage medium 105 via storage device 90.

A user selects for viewing either a TV channel or an on-screen menu, such as a program guide, by using a remote control unit 70. Processor 60 uses the selection information provided from remote control unit 70 via interface 65 to appropriately configure the elements of FIG. 1 to receive a desired program channel for viewing. Processor 60 comprises processor 62 and controller 64. Unit 62 processes (i.e. parses, collates and assembles) program specific information including program guide and system information and controller 64 performs the remaining control functions required in operating decoder 100. Although the functions of unit 60 may be implemented as separate elements 62 and 64 as depicted in FIG. 1, they may alternatively be implemented within a single processor. For example, the functions of units 62 and 64 may be incorporated within the programmed instructions of a microprocessor. Processor 60 configures processor 13, demodulator 15, decoder 17 and decoder system 100 to demodulate and decode the input signal format and coding type. Units 13, 15, 17 and sub-units within decoder 100 are individually configured for the input signal type by processor 60 setting control register values within these elements using a bi-directional data and control signal bus C.

The transport stream provided to decoder 100 comprises data packets containing program channel data and program specific information. Unit 22 directs the program specific information packets to processor 60 which parses, collates and assembles this information into hierarchically arranged tables. Individual data packets comprising the User selected program channel are identified and assembled using the assembled program specific information. The program specific information contains conditional access, network information and identification and linking data enabling the system of FIG. 1 to tune to a desired channel and assemble data packets to form complete programs. The program specific information also contains ancillary program guide information (e.g. an Electronic Program Guide—EPG) and descriptive text related to the broadcast programs as well as data supporting the identification and assembly of this ancillary information.

The program specific information is assembled by processor 60 into multiple hierarchically arranged and inter-linked tables. An exemplary hierarchical table arrangement includes a Master Guide Table (MGT), a Channel Information Table (CIT), Event Information Tables (EITs) and optional tables such as Extended Text Tables (ETTs). The MGT contains information for acquiring program specific information conveyed in other tables such as identifiers for identifying data packets associated with the other tables. The CIT contains information for tuning and navigation to receive a User selected program channel. The EIT contains descriptive lists of programs (events) receivable on the channels listed in the CIT. The ETT contains text messages describing programs and program channels. Additional program specific information describing and supplementing items within the hierarchical tables is conveyed within descriptor information elements. The program specific information acquired by processor 60 via unit 22 is stored within internal memory of unit 60.

Considering FIG. 1 in detail, a carrier modulated with signals carrying program representative audio, video and associated data received by antenna 10, is converted to digital form and processed by input processor 13. Processor 13 includes radio frequency (RF) tuner and intermediate frequency (IF) mixer and amplification stages for down-converting the input signal to a lower frequency band suitable for further processing. In this exemplary system, the input signal received by antenna 10 contains 33 Physical Transmission Channels (PTCs 0–32). Each Physical Transmission Channel (PTC) is allocated a 6 MHz bandwidth and contains, for example, up to 6 sub-channels.

It is assumed for exemplary purposes that a video receiver user selects a sub-channel (SC) for viewing using remote control unit 70. Processor 60 uses the selection information provided from remote control unit 70 via interface 65 to appropriately configure the elements of decoder 100 to receive the PTC corresponding to the selected sub-channel SC. Following down conversion, the output signal from unit 13 for the selected PTC has a bandwidth of 6 MHz and a center frequency in the range of 119–405 MHz. In the following discussion, an RF channel or Physical Transmission Channel (PTC) refers to an allocated broadcaster transmission channel band which encompasses one or more sub-channels (also termed virtual or logical channels).

Processor 60 configures the radio frequency (RF) tuner and intermediate frequency (IF) mixer and amplification stages of unit 13 to receive the selected PTC. The down-converted frequency output for the selected PTC is demodulated by unit 15. The primary functions of demodulator 15 are recovery and tracking of the carrier frequency, recovery of the transmitted data clock frequency, and recovery of the video data itself. Unit 15 also recovers sampling and synchronization clocks that correspond to transmitter clocks and are used for timing the operation of processor 13, demodulator 15 and decoder 17. The recovered output from unit 15 is provided to decoder 17.

The output from demodulator 15 is mapped into byte length data segments, deinterleaved and Reed-Solomon error corrected according to known principles by unit 17. In addition, unit 17 provides a Forward Error Correction (FEC) validity or lock indication to processor 60. Reed-Solomon error correction is a known type of Forward Error Correction. The FEC lock indication signals that the Reed-Solomon error correction is synchronized to the data being corrected and is providing a valid output. It is to be noted that the demodulator and decoder functions implemented by units 13, 15 and 17 are individually known and generally described, for example, in the reference text *Digital Communication*, Lee and Messerschmidt (Kluwer Academic Press, Boston, Mass., U.S.A., 1988).

The corrected output data from unit 17 is processed by MPEG compatible transport processor and demultiplexer 22. The individual packets that comprise either particular program channel content, or program specific information, are identified by their Packet Identifiers (PIDs). Processor 22 separates data according to type based on an analysis of Packet Identifiers (PIDs) contained within packet header information and provides synchronization and error indication information used in subsequent video, audio and data decompression.

The corrected output data provided to processor 22 is in the form of a transport datastream containing program channel content and program specific information for many programs distributed through several sub-channels. The program specific information in this exemplary description describes sub-channels present in a transport stream of a particular PTC. However, in another embodiment the program specific information may also describe sub-channels located in other PTCs and conveyed in different transport streams. Groups of these sub-channels may be associated in that their source is a particular broadcaster or they occupy the transmission bandwidth previously allocated to an analog NTSC compatible broadcast channel. Further, individual packets that comprise a selected program channel in the transport stream are identified and assembled by processor 60 operating in conjunction with processor 22 using PIDs contained in the program specific information.

The program specific information is in the form of hierarchically arranged tables including an MGT, CIT, EIT, and ETT together with supplementary descriptor information. The PID that identifies packets comprising the MGT data is predetermined and stored within processor 60 internal memory. Further, the MGT conveys the PIDs that identify the CIT, EIT, and ETT data and conveys other information indicating the size of these tables. Processor 60 monitors the MGT for updates to identify any changes in PIDs or table sizes. Therefore, after processor 60 determines from the FEC lock indication provided by unit 17 that valid data is being provided to transport processor 22, the MGT may be acquired without additional PID information. Using Control signal C, processor 60 configures transport processor 22 to select the data packets comprising the remaining program specific information including the CIT, EIT and ETT data. Processor 22 matches the PIDs of incoming packets provided by unit 17 with PID values pre-loaded in control registers within unit 22 by processor 60. Further, processor 60 accesses, parses and assembles the program specific information packets captured by processor 22 and stores the program specific information within its internal memory. Processor 60 derives tuning parameters including PTC carrier frequency, demodulation characteristics, and sub-channel PIDs, from the acquired program specific information. Processor 60 uses this information in configuring units 13, 15, 17 and decoder 100 elements to acquire selected sub-channel (SC) program content.

The program specific information including MGT, CIT, EIT, and ETT data and associated descriptors acquired and collated by processor 60 incorporates advantageous features exemplified in the data formats presented in FIGS. 2–9. These features facilitate the identification, acquisition, assembly and decoding of program channel content and associated program guide data by decoder 100 (FIG. 1). Processor 60 forms a MGT as exemplified by the data format of FIG. 2 by accessing and assembling the program specific information packets that are stored in the unit 60 internal memory. The MGT contains data identifiers e.g. PID_ETT 205 and PID_PG 210 (FIG. 2) enabling the assembly of the CIT, EIT and ETT tables. Processor 60 uses the MGT data identifiers to access and assemble the program specific information packets to form the CIT, EIT, and ETT data and associated descriptors.

Processor 60 uses the acquired CIT channel map information, as exemplified in FIG. 3, to identify the packets comprising the sub-channel SC that the User selected to view. A user selects sub-channel SC for viewing by entering two program channel numbers via remote control unit 70 and interface 65. Individual program channels are advantageously allocated both a first and a second identification number. The first identification number (a major number as indicated by bundle_number 300 in FIG. 3) identifies the broadcast source and broadcaster channel brand number e.g. Fox 5™, Channel 13™. The first identification number indicates a broadcast source of a program or service and may be independent of the RF channel on which the program is broadcast. However, in other embodiments the first identification number may be associated with a broadcast RF channel or be associated with other program characteristics such as a program category or theme e.g. movies. The second identification number (a minor number as indicated by channel_number_in_bundle 305 in FIG. 3) identifies a sub-channel corresponding to a specific service within a group of services provided by a broadcaster. The first and second identification numbers in conjunction identify a particular service as a sub-channel provided by a specific broadcaster. Although, the selected sub-channel SC may occupy an RF bandwidth within an encompassing channel spectrum associated with the broadcast source, neither the first or second identification numbers are associated with such a spectrum. However, this association may be made in an alternative embodiment. This dual numbering system enables a broadcaster to retain channel brand identity across a range of dynamically allocable broadcast sub-channels.

The dual program channel identification numbers used to select sub-channel SC may be entered by the user in a variety of ways. These may include using remote unit 70 to select sub-channel SC from within a hierarchical menu system displaying program channel selections in a program guide or by simple sequential number entry via the unit 70 keypad, for example. The channel selection system may also encompass the use of a different data entry device such as a keyboard or discrete switches, for example. Further, the data entry system also accommodates the entry of a single channel identification number as well as dual identification numbers. Upon detecting a channel selection completion command, processor 60 converts a single channel identification number entry into dual identification numbers. Processor 60 converts the single channel identification number to dual channel identification numbers in accordance with a predetermined conversion map. This conversion may also be performed using a predetermined and stored algorithm or formula. The derived dual identification numbers are used by processor 60 for packet identification, tuning and for identifying other decoder information in the manner previously described as if both numbers had been entered by a user.

Processor 60 uses the received program channel identification numbers 300 and 305 provided from remote control unit 70 via interface 65 to determine the PTC corresponding to the selected sub-channel SC from the CIT. Once the PTC number (item 315 in FIG. 3) is determined, processor 60 (FIG. 1) configures units 13, 15, and 17 to receive the PTC for the selected sub-channel SC. The unique program sub-channel determined from the program channel identification numbers 300 and 305 may alternatively be termed a service or a virtual channel or a logical channel and the CIT may be deemed a virtual channel table. Further, as well as associating a particular PTC with first and second sub-channel identification numbers 300 and 305 of selected sub-channel SC, the CIT also associates other parameters with SC. These parameters include (a) a channel_id 320 for linking the selected sub-channel SC with program content information conveyed in the EITs, (b) a channel_type indicator 325 identifying whether the sub-channel data is, analog e.g. NTSC, digital video e.g. ATSC video or digital audio e.g. ATSC audio, (c) an ETM_flag 330 indicating whether a text message is available for this sub-channel, (d) a channel name 340 and (e) a descriptor 335 e.g. a Service Location Descriptor as described later.

Processor 60 advantageously determines program map information for the selected sub-channel SC from Service Location Descriptor (SLD) conveyed within the CIT. The SLD program map information is exemplified by the data format of FIG. 4. The SLD associates the selected sub-channel SC with packet identifiers, e.g. item 420, used to identify individual packetized datastreams that constitute the components of a program being transmitted on selected sub-channel SC. In addition, the SLD program map information, in conjunction with the CIT, maps the selected sub-channel SC to a program number 405, a PCR (Program Clock Reference) identifier 410, a language code indicator 425, and a stream type identifier 415 identifying a stream as video, audio, control, auxiliary or private information, for example.

The SLD program map information replicates information already present within the Program Map Table (PMT) segment of the MPEG compatible transport stream input to decoder 100. However, by incorporating the SLD within the CIT, the time required by decoder 100 to identify and acquire a program being transmitted on selected sub-channel SC is advantageously reduced. This is because the CIT and SLD provide formatted and linked information sufficient to enable processor 60 to directly configure and tune the system of FIG. 1 to receive the selected sub-channel SC. Specifically, the CIT and SLD directly associate individual first and second sub-channel identification numbers with the PIDs for identifying the datastreams that constitute a program being conveyed on this sub-channel. This enables processor 60 to configure the system of FIG. 1 to receive the selected sub-channel SC without acquiring and using the Program Map Table (PMT) information in the MPEG compatible transport stream input to decoder 100. In addition, the data partitioning, data formatting and data repetition frequency characteristics of the CIT and SLD program map information may be determined independently of the requirements of MPEG PMT information.

The packetized decoded transport stream input to decoder 100 from unit 17 contains video, audio and data representing TV programs, for example, and also contains sub-picture data. The sub-picture data contains picture elements associated with programs and channels selectable by a user for viewing including program guides, display commands, subtitling, selectable menu options or other items, for example. As such, the sub-picture data includes the EIT containing descriptive lists of programs (events) receivable on the sub-channels listed in the CIT and also contains the ETT containing text messages describing programs and program sub-channels.

Processor 60 determines from the CIT and SLD the PIDs of the video, audio and sub-picture streams constituting the program being transmitted on selected sub-channel SC. Processor 22, matches the PIDs of incoming packets provided by decoder 17 with PID values of the video, audio and sub-picture streams being transmitted on sub-channel SC. These PID values are pre-loaded in control registers within unit 22 by processor 60. In this manner, processor 22 captures packets constituting the program transmitted on sub-channel SC and forms them into MPEG compatible video, audio and sub-picture streams for output to video decoder 25, audio decoder 35 and sub-picture processor 30 respectively. The video and audio streams contain compressed video and audio data representing the selected sub-channel SC program content. The sub-picture data contains the EIT and ETT information associated with the sub-channel SC program content.

Decoder 25 decodes and decompresses the MPEG compatible packetized video data from unit 22 and provides decompressed program representative pixel data to NTSC encoder 45 via multiplexer 40. Similarly, audio processor 35 decodes the packetized audio data from unit 22 and provides decoded and amplified audio data, synchronized with the associated decompressed video data, to device 55 for audio reproduction. Processor 30 decodes and decompresses sub-picture data received from unit 22.

The sub-picture data decoded by processor 30 includes text messages (Extended Text Messages—ETMs) in an ETT in the exemplary data format presented in FIG. 5. The text messages conveyed in the ETT of FIG. 5 are advantageously partitioned into time periods of specified duration. The segmented text messages describe programs occurring in a period of specified duration and start time e.g. 3 hour blocks starting from 12 a.m., 3 p.m., 6 p.m. . . . etc. Indicators defining the duration and start time applicable to the conveyed text messages are included in the MGT of FIG. 2 (duration item 215 and application_time item 220 of FIG. 2 respectively). A text message (e.g. extended_text_message 505) is conveyed together with a text message identifier (ETM_id 510) in the format of FIG. 5.

Decoder 100 (FIG. 1) is able to more efficiently acquire, process and store program descriptive text messages that are partitioned into time periods of specified duration than is possible in the absence of such segmentation. This is because segmented text messages exclude information occurring outside the specified time period and consequently are smaller than non-segmented text messages. Therefore, segmented text message data occupies less storage space and can be acquired and processed more quickly than larger data blocks of non-segmented data. Further, the data format of FIG. 5 allows a user to acquire text message data for a selected sub-channel SC or a group of selected program sub-channels. This allows the identification, acquisition and decoding of text message data by decoder 100 to be focused on the programs and sub-channels of interest to a user and reduces the acquisition of redundant text message information.

A text message conveyed in an ETT may contain channel information or program (event) information. FIG. 6 shows an exemplary format for assigning a text message identifier ETM_id 510 of FIG. 5 that identifies the type of text message e.g. whether the text message contains channel information (item 610 of FIG. 6) or program information (item 605 of FIG. 6). The text message identifier 510 (FIG. 5) also identifies the source e.g. sub-channel to which the text message pertains.

A text message 505 conveyed in the ETT of FIG. 5 is compressed and formatted according to the multiple compressed text string format of FIG. 7. The compressed text string format advantageously incorporates indicators facilitating the identification and decoding of multiple compressed text strings by processor 30 in decoder 100 of FIG. 1. Processor 30 decodes text string 505 (FIG. 5) received from unit 22 (FIG. 1) by determining the compression, coding and language characteristics of the text string from indicators 705, 710 and 715 (FIG. 7) respectively. Specifically, processor 30, operating in conjunction with processor 60, decompresses received text string 505 by applying a decompression function e.g. a Huffman decompression function, selected using indicator 705. Similarly, processor 30, decodes the received text string by applying a decoding function interpreting text characters according to a character code set selected using indicator 710 and a language code set selected using indicator 715. Further, processor 30 determines the number of text strings to be processed and the number of bytes in each text string from indicators 725 and 720 respectively.

FIG. 8 shows an exemplary indicator definition for compression indicator 705 within the multiple compressed text string format of FIG. 7. It is to be noted that compression indicator 705 may indicate that no compression function is employed within a text string. In this case, processor 30 does not apply a decompression function to the text string received from unit 22. FIG. 9 shows an exemplary indicator definition for coding indicator 710 within the multiple compressed text string format of FIG. 7.

Processor 30 assembles and formats the decoded and decompressed text string elements of text string 505 (FIG. 5) to form a decoded text string for output to On-Screen Display (OSD) and graphics generator 37 (FIG. 1). Unit 37 interprets and formats the text string character data from unit 30 and generates formatted pixel mapped text and graphics for presentation on unit 50. The formatted pixel mapped text and graphics data may represent a program guide or other type of menu or user interface for subsequent display on unit 50. Unit 37 also processes EIT, ETT and other information to generate pixel mapped data representing, subtitling, control and information menu displays including selectable menu options, and other items, for presentation on unit 50. The control and information displays enable function selection and entry of device operating parameters for User operation of decoder 100.

The text and graphics produced by OSD generator 37 are generated in the form of overlay pixel map data under direction of processor 60. The overlay pixel map data from unit 37 is combined and synchronized with the decompressed pixel representative data from MPEG decoder 25 in encoder 45 via multiplexer 40 under direction of processor 60. Combined pixel map data representing a video program on sub-channel SC together with associated sub-picture text message data is encoded by NTSC encoder 45 and output to device 50 for display.

In a storage mode of the system of FIG. 1, the corrected output data from unit 17 is processed by decoder 100 to provide an MPEG compatible datastream for storage. In this mode, a program is selected for storage by a user via remote unit 70 and interface 65. Processor 22, in conjunction with processor 60 forms condensed program specific information including MGT, CIT, EIT and ETT data and descriptors containing the advantageous features previously described. The condensed program specific information supports decoding of the program selected for storage but excludes unrelated information. Processor 60, in conjunction with processor 22 forms a composite MPEG compatible datastream containing packetized content data of the selected program and associated condensed program specific information. The composite datastream is output to storage interface 95.

Storage interface 95 buffers the composite datastream to reduce gaps and bit rate variation in the data. The resultant buffered data is processed by storage device 90 to be suitable for storage on medium 105. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the condensed program specific information on medium 105.

FIG. 10 shows a method for generating program specific information including MGT, CIT, EIT and ETT data and descriptors containing the advantageous features previously described. The method may be employed at an encoder for broadcasting video data such as the data received by antenna 10 of FIG. 1 or the method may be employed within a decoder unit such as within processor 60 of FIG. 1.

Following the start at step 800 of FIG. 10, a CIT is generated in step 810. The CIT contains sub-channel and program identification information enabling acquisition of available broadcast programs and sub-channels. The CIT incorporates first and second sub-channel identification numbers and an SLD containing packet identifiers for identifying individual packetized datastreams that constitute individual programs to be transmitted on particular sub-channels. The generated CIT also incorporates items linked to listed program sub-channels including a program number, a PCR (Program Clock Reference) identifier, a language code indicator, and a stream type identifier, as previously described in connection with FIG. 1.

In step 815, an EIT is generated containing program guide information including descriptive lists of programs (events) receivable on the sub-channels listed in the CIT. In step 820, an ETT is generated containing text messages describing programs, for example. Each text message is partitioned into time periods of specified duration. The duration and application time of the segmented text message data is also defined by indicators in the ETT itself. The text message data is encoded and compressed according to known techniques and conveyed in the ETT along with indicators defining the compression, coding and language characteristics employed. The ETT is also generated to include indicators defining the number of text strings to be processed and the number of bytes in each text string. In step 822 an MGT is generated containing data identifiers enabling the identification and assembly of CIT, EIT and ETT information. The MGT also conveys table size information for the previously generated CIT, EIT and ETT.

In step 825, program specific information is formed including the MGT, CIT, EIT and ETT data and descriptors generated in steps 805–822. In step 830, the program specific information together with video and audio program representative components for multiple sub-channels is formatted into a transport stream for output. In step 835, the output transport stream is further processed to be suitable for transmission to another device such as a receiver, video server, or storage device for recording on a storage medium, for example. The processes performed in step 835 include known encoding functions such as data compression Reed-Solomon encoding, interleaving, scrambling, trellis encoding, and carrier modulation. The process is complete and terminates at step 840. In the process of FIG. 10, multiple CIT, EIT and ETT tables may be formed and incorporated in the program specific information in order to accommodate expanded numbers of sub-channels.

The architecture of FIG. 1 is not exclusive. Other architectures may be derived in accordance with the principles of the invention to accomplish the same objectives. Further, the functions of the elements of decoder 100 of FIG. 1 and the process steps of FIG. 10 may be implemented in whole or in part within the programmed instructions of a microprocessor. In addition, the principles of the invention apply to any form of MPEG or non-MPEG compatible electronic program guide. A datastream formed according to the invention principles may be used in a variety of applications including video server or PC type communication via telephone lines, for example. A program datastream with one or more components of video, audio and data formed to incorporate program specific information according to invention principles may be recorded on a storage medium and transmitted or re-broadcast to other servers, PCs or receivers. Further, any reference herein to "bandwidth" is to be interpreted expansively to include bit rate capacity and is not limited to a frequency spectrum, for example.

What is claimed is:

1. Apparatus for decoding packetized program information to provide data content of a program, comprising:
    means for identifying channel map information in said packetized program information, said channel map information including,
        (a) a first identification number for use in identifying a first broadcast sub-channel, said first identification number being associated with a first broadcast source, and
        (b) a second identification number for use in identifying said first broadcast sub-channel from among a group of sub-channels associated with said first identification number and said first broadcast source; and
    means for assembling said identified channel map information to form a channel map suitable for use in identifying data using said first and second identification numbers in conjunction, said identified data constituting a program transmitted on said first broadcast sub-channel.

2. Apparatus according to claim 1, wherein
said second identification number identifies a sub-channel bandwidth within a bandwidth allocated to said first broadcast source.

3. Apparatus according to claim 2, wherein
said first and second identification numbers in conjunction identify one of a plurality of sub-channels within said allocated bandwidth.

4. Apparatus according to claim 1, wherein
said second identification number identifies at least one of a) an RF sub-channel, b) a program or data service, and c) a type of service transmitted on said first broadcast sub-channel.

5. Apparatus for decoding packetized program information to provide data content of a program, comprising:
    means for identifying channel map information in said packetized program information, said channel map information including,
        (a) a first identification number for use in identifying a first broadcast sub-channel, said first identification number being associated with a first broadcast source, and
        (b) a second identification number for use in identifying said first broadcast sub-channel from among a group of sub-channels associated with said first identification number; wherein
            said second identification number identifies at least one of a) an RF sub-channel, b) a program or data service, and c) a type of service transmitted on said first broadcast sub-channel, and said type of service indicates an analog service when said second identification number is zero, and
        means for assembling said identified channel map information to form a channel map suitable for use in identifying data using said first and second identification numbers in conjunction, said identified data constituting a program transmitted on said first broadcast sub-channel.

6. Apparatus according to claim 1, wherein
said first identification number identifies at least one of a) a broadcaster, b) an RF channel, and c) a program category.

7. Apparatus according to claim 1, including
means for selecting said first broadcast sub-channel using said formed channel map in response to user entry of said first and second identification numbers.

8. Apparatus according to claim 1, including
means for tuning to receive said program transmitted on said first broadcast sub-channel using said channel map.

9. Apparatus according to claim 8, wherein
said decoding apparatus tunes to receive said program transmitted on said first broadcast sub-channel in response to User entry of said first and second identification numbers.

10. Apparatus according to claim 8, wherein
said tuning means tunes to an RF transmission sub-channel carrier frequency determined from said channel map information, said carrier frequency being associated by said channel map information with said first and second identification numbers.

11. Apparatus according to claim 1, including
means for determining from said channel map whether a signal transmitted on said first broadcast sub-channel is digital or analog and in response to said determination said decoder processes said analog video data differently than digital data.

12. Apparatus according to claim 1, wherein
said channel map information associates said first broadcast sub-channel with packet identifiers used to identify individual packetized datastreams that constitute said program transmitted on said first broadcast sub-channel.

13. Apparatus according to claim 1, including
means for identifying a virtual channel using said first and second identification numbers in conjunction.

14. Apparatus for decoding packetized program information to provide data content of a program, comprising:
    means for identifying channel map information in said packetized program information, said channel map information including,
        (a) a first identification number for use in identifying a first broadcast sub-channel, said first identification number being associated with a first broadcast source, and
        (b) a second identification number for use in identifying said first broadcast sub-channel from among a group of sub-channels associated with said first identification number;

means for assembling said identified channel map information to form a channel map suitable for use in identifying data using said first and second identification numbers in conjunction, said identified data constituting a program transmitted on said first broadcast sub-channel; and means for determining from said channel map whether a signal transmitted on said first broadcast sub-channel is digital or analog.

15. Apparatus according to claim 1, including means for identifying from said channel map a channel name of said first broadcast sub-channel.

16. A storage medium containing digital data representing video information comprising:

a video program; and channel map information including,
  (a) a first identification number, and
  (b) a second identification number, said first and second identification numbers in conjunction being associated with a sub-channel used for transmission of said video program from a specific broadcast source, wherein
    said channel map information associates said first and second identification numbers with packet identifiers used to identify individual packetized datastreams that constitute said video program.

17. Apparatus for forming program guide information suitable for decoding packetized program information to provide data content of a program, comprising:

means for forming channel map information including
  (a) a first identification number for use in identifying a first broadcast sub-channel, said first identification number being associated with a first broadcast source, and
  (b) a second identification number for use in identifying said first broadcast sub-channel from among a group of sub-channels associated with said first identification number and said first broadcast source wherein said first and second identification numbers in conjunction identify data constituting a program from said first broadcast source; and
  (c) assembly information supporting assembly of said channel map information; and means for incorporating said channel map information into packetized data for output to a transmission channel.

18. Apparatus according to claim 17, wherein said second identification number identifies a sub-channel bandwidth within a bandwidth allocated to said first broadcast source.

19. Apparatus according to claim 18, wherein said first and second identification numbers in conjunction identify one of a plurality of sub-channels within said allocated bandwidth.

20. Apparatus according to claim 17, wherein said second identification number identifies at least one of a) an RF sub-channel, b) a program or data service, and c) a type of service transmitted on said first broadcast sub-channel.

21. Apparatus according to claim 17, wherein said first identification number identifies at least one of a) a broadcaster, b) an RF channel, and c) a program category.

22. Apparatus according to claim 17, wherein said first and second identification numbers are each comprised of one or more digits.

23. Apparatus according to claim 17, wherein said channel map information associates said first broadcast sub-channel with packet identifiers used to identify individual packetized datastreams that constitute said program transmitted on said first broadcast sub-channel.

24. Apparatus for forming program guide information suitable for decoding packetized program information to provide data content of a program, comprising:

means for forming channel map information including
  (a) a first identification number for use in identifying a first broadcast sub-channel, said first identification number being associated with a first broadcast source, and
  (b) a second identification number for use in identifying said first broadcast sub-channel from among a group of sub-channels associated with said first identification number wherein said first and second identification numbers in conjunction identify data constituting a program from said first broadcast source; and
  (c) assembly information supporting assembly of said channel map information; wherein
    said formed channel map associates a channel name with said first broadcast sub-channel, and
    means for incorporating said channel map information into packetized data for output to a transmission channel.

25. Apparatus according to claim 17, wherein said first and second identification numbers identify a virtual channel.

26. Apparatus for forming program guide information suitable for decoding packetized program information to provide data content of a program, comprising:

means for forming channel map information including
  (a) a first identification number for use in identifying a first broadcast sub-channel, said first identification number being associated with a first broadcast source, and
  (b) a second identification number for use in identifying said first broadcast sub-channel from among a group of sub-channels associated with said first identification number wherein said first and second identification numbers in conjunction identify data constituting a program from said first broadcast source; and
  (c) assembly information supporting assembly of said channel map information; wherein
    said formed channel map associates a channel type with said first broadcast sub-channel, said channel type indicating whether said first broadcast sub-channel signal is digital or analog, and
    means for incorporating said channel map information into packetized data for output to a transmission channel.

27. Apparatus according to claim 26, wherein said type of service indicates an analog service when said second identification number is zero.

28. Apparatus according to claim 17, wherein said formed channel map associates a transmission channel carrier frequency with said first broadcast sub-channel.

29. Apparatus according to claim 17, wherein said formed channel map associates a program number with said first broadcast sub-channel, said program number linking other information in said program guide associated with said first broadcast sub-channel.

30. A method for decoding packetized program information to provide data content of a program, comprising the steps of:

identifying channel map information in said packetized program information, said channel map information including, a first identification number for use in identifying a first broadcast sub-channel, said first identification number being associated with a first broadcast source, and a second identification number for use in identifying said first broadcast sub-channel from among a group of sub-channels associated with said first identification number and said first broadcast source; and assembling said identified information to form a channel map suitable for use in identifying data using said first and second identification numbers in conjunction, said identified data constituting a program transmitted on said first broadcast sub-channel.

31. A method for forming program guide information suitable for decoding packetized program information to provide data content of a program, comprising the steps of:

forming channel map information including a first identification number for use in identifying a first broadcast sub-channel, said first identification number being associated with a first broadcast source, and a second identification number for use in identifying said first broadcast sub-channel from among a group of sub-channels associated with said first identification number and said first broadcast source wherein said first and second identification numbers in conjunction identify data constituting a program from said first broadcast source; and assembly information supporting assembly of said channel map information; and incorporating said channel map information into packetized data for output to a transmission channel.

* * * * *